United States Patent [19]

Ketelaar

[11] 3,774,067

[45] Nov. 20, 1973

[54] CIRCUIT ARRANGEMENT FOR CORRECTING A LINE DEFLECTION CURRENT FLOWING IN A PICTURE DISPLAY APPARATUS

[76] Inventor: Peter Ketelaar, Emmasingel, Eindhoven, Netherlands

[22] Filed: Aug. 12, 1971

[21] Appl. No.: 171,179

[30] Foreign Application Priority Data

Aug. 18, 1970 Netherlands ........................ 7012149

[52] U.S. Cl. ............................................ 315/27 TD

[51] Int. Cl. ............................................ H01j 29/70

[58] Field of Search .................... 315/27 TD, 27 GD, 315/27 R

[56] References Cited

UNITED STATES PATENTS

| | | | |
|---|---|---|---|
| 3,310,705 | 3/1967 | Nicholson | 315/27 TD |
| 3,319,112 | 5/1967 | Annus et al. | 315/27 GD |
| 3,398,318 | 8/1968 | Bazin | 315/27 TD |
| 3,192,433 | 6/1965 | Schneider | 315/27 TD |
| 3,271,617 | 9/1966 | Boekhorst | 315/27 TD |
| 3,434,001 | 3/1969 | Okuda | 315/27 R |

*Primary Examiner*—Carl D. Quarforth
*Assistant Examiner*—J. M. Potenza
*Attorney*—Frank R. Trifari

[57] ABSTRACT

A circuit arrangement for correcting the line deflection current in a picture display apparatus. The parallel arrangement of a capacitor and one or more current sources is connected in series with the deflection coil and the series arrangement of a rectifier conducting during the flyback period and an RC network is connected in parallel therewith. The linearity may be improved and/or other corrections may be performed with the aid of the current sources. The voltage produced across the RC network may be used as a supply voltage elsewhere in the display apparatus.

6 Claims, 3 Drawing Figures

INVENTOR.
PETER KETELAAR

BY

AGENT

CIRCUIT ARRANGEMENT FOR CORRECTING A LINE DEFLECTION CURRENT FLOWING IN A PICTURE DISPLAY APPARATUS

The invention relates to a circuit arrangement for correcting preferably the linearity of a periodical, mainly sawtooth line deflection current flowing in a picture display apparatus in a deflection coil having a scan period and a flyback period, comprising a deflection generator for generating said current between two terminals, and the parallel arrangement of a capacitor and a current source.

In circuit arrangements for the horizontal magnetic deflection of one or more electron beams in the television technique the resistivity of the deflection coil causes an unwanted non-linearity of the current flowing through this coil. A known method of correcting this non-linearity is the use of a coil which is arranged in series with the deflection coil and whose core is premagnetized. The correction thus obtained is, however, not linear and even gives rise to other, though smaller deviations in the deflection.

A different method has been used in French Pat. No. 1,230,241. in this description the electrode of the efficiency diode not connected to the line output transformer is connected to a capacitor through which a constant current flows during the conducting period of the diode. However, this circuit arrangement has drawbacks; it requires a large number of components particularly for realizing the constant current source, while part of the sawtooth current flowing through the efficiency diode also flows through this source, which current has a DC component causing a needless dissipation. In addition the efficiency diode frequently does not conduct during the entire scan period so that the envisaged linearisation is only obtained in part. Especially in colour picture tubes, such as the so-called indexing tube, in which the horizontal deflection must have a very good linearity, this circuit arrangement is inadequate. An object of the present invention is to provide in the first place a linearity correction which satisfies high quality requirements with a minimum dissipation and a minimum number of components. To this end the circuit arrangement according to the invention is characterized in that the series arrangement of a rectifier controlled so as to conduct during the flyback period and a parallel RC network is connected between the deflection coil and a terminal of the generator and that the parallel arrangement of the capacitor and the current source is connected in parallel with this series arrangement.

In order that the invention may be readily carried into effect, some embodiments thereof will now be described in detail by way of example, with reference to the accompanying diagrammatic drawing in which.

Figure 1:
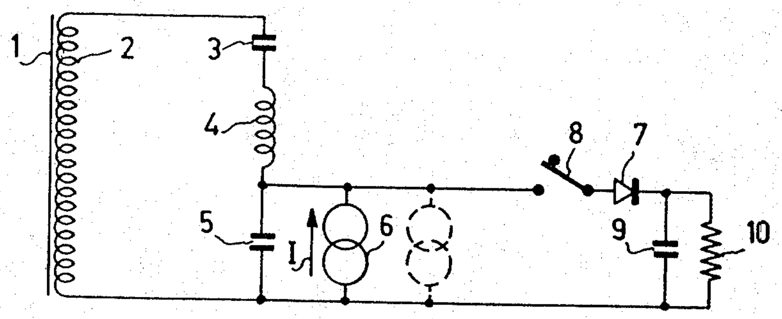
FIG. 1 shows the principle of the invention.

In FIG. 1 the reference numeral 1 denotes the core of a line output transformer in a picture display apparatus on which core a primary winding not further shown in the Figure is wound to which voltage pulses of line frequency are applied in known manner. A secondary winding 2 is wound on core 1. The series arrangement of an isolation capacitor 3, the deflection coil 4 and a further capacitor 5 is connected across winding 2. Winding 2 may alternatively form part of the primary winding when an autotransformer is used. Other secondary windings not shown in FIG. 1 are wound on core 1. One of these windings serves to generate the EHT which is required for the acceleration anode of the display tube. A current source 6 is arranged in parallel with capacitor 5. When the current I provided by source 6 is constant during the line scan period, the voltage across capacitor 5 is a linear function of time. In case of a correct polarity and value of the current I, the voltage drop across the resistivity with which deflection coil 4 is beset can be exactly compensated for.

However, the supply of charge to capacitor 5 during the scan period also implies that the same quantity of charge is to be depleted during the flyback period. According to the invention this may be effected with the aid of a diode which is rendered conducting during the flyback period and which thus withdraws charge from capacitor 5. This is diagrammatically shown in FIG. 1 by means of the series arrangement of a diode 7 and a switch 8. The parallel arrangement of a capacitor 9 and a resistor 10 is connected between the electrode of diode 7 remote from switch 8, in this embodiment its cathode, and the junction of winding 2, capacitor 5 and source 6, which junction may be connected to earth. If the time constant of this parallel arrangement is sufficiently long relative to the line period, diode 7 operates as a peak rectifier, that is to say, it conducts during the flyback period only for a short time. Thus a positive direct voltage is produced across capacitor 9.

Figure 2:
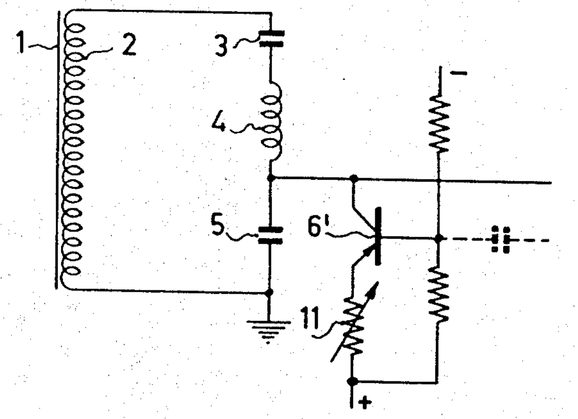
FIGS. 2 and 3 show embodiments of the circuit arrangement according to the invention.

By rendering current I adjustable, the sawtooth voltage across capacitor 5 and hence the linearity correction may be adjusted in a simple manner. A possible embodiment of current source 6 is shown in FIG. 2. In this Figure current source 6 is formed as a pnp transistor 6' including an adjustable emitter resistor 11 as a linearity control element. The junction of winding 2 and capacitor 5 is connected to ground while the base and the emitter are fed by a negative and a positive auxiliary voltage respectively.

Figure 3:
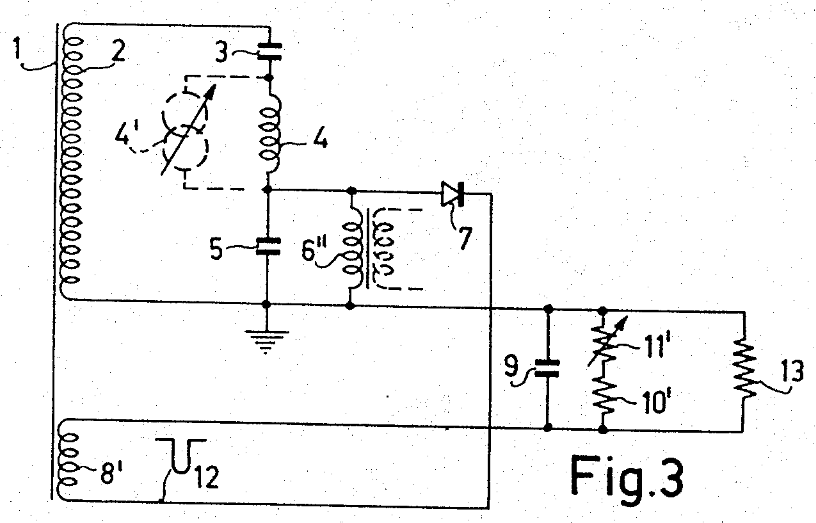

FIG. 3 shows a more practical embodiment of the circuit arrangement according to FIG. 1. Diode 7 is controlled by a secondary winding 8' on a core 1 in which line flyback pulses 12 are induced. A coil 6'' serves as a current source whose inductance is chosen to be so high that its impedance for the line frequency is very high relative to that of capacitor 5. As a result the current flowing through coil 6'' will substantially not vary during the scan period and coil 6'' may be considered as a substantially constant current source. Since coil 6'' is present, the mean voltage across capacitor 5 remains zero. Capacitors 3 and 5 may be chosen to be such that they jointly ensure the so-called S-correction by which, as is known, a detrimental ambiant radiation of line flyback pulses may be reduced when they have equal capacitances. A horizontal centering current may be obtained by connecting a current source 4' in parallel with deflection coil 4 which source supplies an adjustable direct current. Resistor 10 of FIG. 1 is replaced in FIG. 3 by the series arrangement of a resistor 10' of fixed value and an adjustable resistor 11'. It may be noted that the part of the current flowing through deflection coil 4 which also flows through coil 6'' is very small because coil 6'' has a high inductance. Consequently, the dissipation of the circuit arrangement is small. This likewise applies to the embodiment of FIG. 2.

Since coil 6″ is not a perfect current source, the current flowing through diode 7 during its short conducting period is determined by the resistive path supplied thereto, namely resistors 10′ and 11′. This current and hence the sawtooth voltage across capacitor 5 may be adjusted by means of resistor 11′. The mean current flowing through coil 6″ is in fact equal to the mean current flowing through resistors 10′ and 11′. Thus adjustable resistor 11′ is the linearity control element. Since the voltage prevailing across capacitor 9 is a smoothed voltage, resistor 11′ may be placed at an arbitrary distance from the deflection generator, which may be considered as an important advantage. In addition, the voltage prevailing across capacitor 9 is not dependent on the value of resistor 11′, but is exclusively determined by the pulse 12 originating from winding 8′, which pulse renders diode 7 conducting. Consequently, this voltage is substantially constant and may advantageously be used as a supply voltage for one or more parts of the picture display apparatus. Such parts may be considered as a resistor 13 connected in parallel with capacitor 9. Lest the linearity of the deflection is influenced by the current supplied to these parts, this current must of course by comparatively constant. Such a part may be, for example, the intermediate frequency amplifier if the display apparatus is a television receiver, or the field oscillator whose current outputs undergo a variation which is negligibly small relative to the current flowing through resistors 10′ and 11′. The supply of current to the field oscillator has the known advantage that the vertical dimension of the picture displayed varies to the same extent as the horizontal dimension when the line flyback pulses 12 vary in amplitude for some reason or other.

A condition for the satisfactory operation of the circuit arrangement of FIG. 3 is that the amplitude of pulse 12 during the flyback period must be larger than the maximum voltage across capacitor 5 during the scan period.

The invention is based on the recognition of the fact that the circuit arrangement of FIG. 1 is alternatively suitable for performing corrections other than the linearity correction. Current source 6 must then supply a current which is not constant, but which has a given variation as a function of time. It is alternatively possible to connect different current sources for different corrections in parallel with each other. One embodiment is a source which supplies terms of an order higher than the third order so that the S-correction can be better performed. The average supply of charge to capacitor 5 must be zero in all cases. This is effected automatically with the aid of the circuit arrangement according to the invention. In fact, the same quantity of charge of capacitor 5 is depleted through diode 7 during the flyback period as is supplied to this capacitor by the current sources during the scan period. If this were not the case, the voltage across capacitor 5 would tend to vary and the current conducted away by the resistors 10′, 11′ and 13 (mainly through resistors 10′ and 11′) would vary in such a manner that the equilibrium would again be reached. If one of the current sources is formed as a coil, as is the case in FIG. 3, the adjusting value of resistor 11′ cannot exert any influence on the removed current so that the adjustment of the linearity remains independent of the outer corrections. It is evident from the foregoing that diode 7 performs a dual function, to wit that of a controlled switch and that of a peak rectifier.

It is to be noted that a coil having a high inductance such as coil 6″ in FIG. 3 may operate as a current source only when an asymmetric correction is concerned, that is to say, when a DC component is to be supplied as is the case for the linearity correction. If this is not the case, as in the embodiment of the higher term correction mentioned hereinbefore, such a coil cannot be used. The current sources may then be formed by means of transistors such as transistor 6′ in FIG. 2, each of which receives a suitable signal through a capacitor at their bases. The collector current of such a transistor must be such that the integration thereof by means of capacitor 5 provides the desired voltage across this capacitor. Alternatively, a transformer may be used of which coil 6″ in FIG. 3 constitutes a secondary winding while a primary winding thereof is controlled by a suitable signal.

In a practical embodiment of the circuit arrangement according to FIG. 3, the various elements may have the following values:

| | |
|---|---|
| capacitor 3 | 120 nF |
| deflection coil 4 | 5 mH |
| capacitor 5 | 820 nF |
| coil 6″ | 10 mH. |

The controlled diode 7 is present in the embodiments described. It is evident that both functions of diode 7, i.e. of a switch and of a rectifier, may be performed by a transistor. When using an npn transistor, for example, the collector thereof may be connected to the junction of deflection coil 4 and capacitor 5 and the emitter may be connected to the junction of capacitor 9 and resistor 10 (in FIG. 1) while the base receives a positively directed flyback pulse. A condition therefor is that the collector voltage, which is the voltage across capacitor 5, is always positive to the emitter voltage.

What is claimed is:

1. A circuit for adjusting the current flowing through a deflection coil, said circuit comprising a deflection generator means coupled to said coil for supplying a deflection current; a first capacitor series coupled with respect to said coil and said generator; means for correcting the current flowing through said coil comprising a first current source parallel coupled to said first capacitor; and means for keeping the average charge across said first capacitor zero comprising a resistor, a second capacitor parallel coupled to said resistor and to said generator, and a controlled rectifier conducting during the flyback time coupled between said capacitors; whereby an additional current source can be coupled to said coil for additional correction.

2. A circuit as claimed in claim 1 wherein said second capacitor comprises means for supplying current to other portions of television display circuit.

3. A circuit as claimed in claim 1 wherein said generator comprises a first winding means for supplying said deflection current and a second winding means for supplying a control voltage to said controlled rectifier.

4. A circuit as claimed in claim 1 wherein said first current source comprises a second coil having a large impedance compared to the impedance of said first capacitor at the deflection frequency and said resistor comprises an adjustable resistor, whereby said second coil corrects the linearity of said deflection coil current and said adjustable resistor is a linearity adjustor.

5. A circuit as claimed in claim 1 wherein said current source comprises a plurality of paralleled coupled current source means for correcting said deflection current for different effects.

6. A circuit as claimed in claim 1 wherein said current source comprises a transistor.

* * * * *

PO-1050
(5/69)

UNITED STATES PATENT OFFICE

CERTIFICATE OF CORRECTION

Patent No. 3,774,067 Dated November 20, 1973

Inventor(s) PETER KETELAAR

It is certified that error appears in the above-identified patent and that said Letters Patent are hereby corrected as shown below:

IN THE TITLE PAGE below "Inventor:" insert -- Assignee: U.S. Philips Corporation, New York, N.Y. --;

Signed and sealed this 18th day of June 1974.

(SEAL)
Attest:

EDWARD M.FLETCHER,JR.
Attesting Officer

C. MARSHALL DANN
Commissioner of Patents